US012640281B2

(12) United States Patent
Hongo et al.

(10) Patent No.: US 12,640,281 B2
(45) Date of Patent: May 26, 2026

(54) CONDUCTIVE NONWOVEN FABRIC, SHIELDING TAPE, AND WIRE HARNESS

(71) Applicant: Yazaki Corporation, Tokyo (JP)

(72) Inventors: Satoko Hongo, Susono (JP); Hiroki Kondo, Susono (JP)

(73) Assignee: YAZAKI CORPORATION, Tokyo (JP)

(*) Notice: Subject to any disclaimer, the term of this patent is extended or adjusted under 35 U.S.C. 154(b) by 157 days.

(21) Appl. No.: 18/459,932

(22) Filed: Sep. 1, 2023

(65) Prior Publication Data

US 2023/0411039 A1 Dec. 21, 2023

Related U.S. Application Data

(63) Continuation of application No. PCT/JP2022/040040, filed on Oct. 26, 2022.

(30) Foreign Application Priority Data

Nov. 1, 2021 (JP) ................................ 2021-178590

(51) Int. Cl.
*H01B 7/08* (2006.01)
*D06M 11/83* (2006.01)
*H01B 7/00* (2006.01)
*H01B 17/64* (2006.01)

(52) U.S. Cl.
CPC ........... *H01B 7/0045* (2013.01); *D06M 11/83* (2013.01); *H01B 17/64* (2013.01); *D10B 2401/16* (2013.01)

(58) Field of Classification Search
CPC ............ H01B 7/08; H01B 11/06; H01B 11/18
USPC ..................................................... 174/117 M
See application file for complete search history.

(56) References Cited

U.S. PATENT DOCUMENTS 6,906,257 B2 * 6/2005 Saccomanno ....... C03C 17/3607 385/100
8,351,220 B2 * 1/2013 Liang .................. H05K 9/0088 361/818
2016/0319471 A1 11/2016 Lee et al.
2020/0020462 A1 * 1/2020 Garrett ............... H01B 11/1869
2021/0402720 A1 * 12/2021 Christy .................. B29C 73/10

FOREIGN PATENT DOCUMENTS

JP 7-166467 A 6/1995
JP 2007-56287 A 3/2007
JP 2008-223189 A 9/2008
JP 2012-104727 A 5/2012
JP 2014-201862 A 10/2014
JP 2017-509160 A 3/2017
JP 2018-152296 A 9/2018
JP 2019-075375 A 5/2019
WO WO 2021/199717 * 10/2021

* cited by examiner

*Primary Examiner* — Chau N Nguyen
(74) *Attorney, Agent, or Firm* — Sughrue Mion, PLLC

(57) ABSTRACT

A conductive nonwoven fabric includes: a nonwoven fabric; and a plating portion having a conductive metal and covering a fiber of the nonwoven fabric. A value obtained by dividing an electric resistance value at an intermediate layer of the conductive nonwoven fabric by an electric resistance value at a surface layer of the conductive nonwoven fabric is 4.0 or less. The intermediate layer is a layer at an intermediate position in a thickness direction of the conductive nonwoven fabric.

5 Claims, 11 Drawing Sheets

FIG. 6

| METHOD | | | SUPERCRITICAL TREATMENT | | SUPERCRITICAL TREATMENT | | CONDUCTIVITY IMPARTING BY SPUTTERING | |
|---|---|---|---|---|---|---|---|---|
| PLATING STATE | | | APPLY PLATING TO INSIDE OF NONWOVEN FABRIC | | NOT APPLY PLATING TO INSIDE OF NONWOVEN FABRIC | | ONLY IMPART CONDUCTIVITY TO FRONT SURFACE OF NONWOVEN FABRIC | |
| PLATING THICKNESS (μm) | | | ABOUT 0.1 | | ABOUT 0.1 | | | |
| EXAMPLES AND COMPARATIVE EXAMPLES | | | EXAMPLE 1 | EXAMPLE 2 | COMPARATIVE EXAMPLE 1 | COMPARATIVE EXAMPLE 2 | COMPARATIVE EXAMPLE 3 | COMPARATIVE EXAMPLE 4 |
| SIZE (ABOUT mm) | | | 13 × 9 | 13 × 9 | 13 × 9 | 13 × 9 | 13 × 9 | 13 × 9 |
| SURFACE RESISTANCE (Ω/m) | SLICE 1 | SURFACE LAYER | 0.874 | 0.196 | 0.2207 | 0.1303 | 6.39k | 62.66 |
| | | INNER LAYER | 0.375 | 0.615 | UNMEASURABLE | UNMEASURABLE | UNMEASURABLE | UNMEASURABLE |
| | SLICE 2 | SURFACE LAYER | 0.056 | 0.260 | 0.1892 | 0.215 | 297.7k | 355.9k |
| | | INNER LAYER | 0.088 | 0.168 | UNMEASURABLE | UNMEASURABLE | UNMEASURABLE | UNMEASURABLE |
| THICKNESS (mm) | SLICE 1 | FOUR-POSITION AVERAGE | 0.60 | 0.84 | 1.39 | 1.62 | 1.6 | 1.8 |
| | SLICE 2 | FOUR-POSITION AVERAGE | 0.70 | 0.65 | 1.56 | 1.47 | 1.4 | 1.2 |

CONDUCTIVE NONWOVEN FABRIC, SHIELDING TAPE, AND WIRE HARNESS

CROSS-REFERENCE TO RELATED APPLICATIONS

This is a continuation of International Application No. PCT/JP2022/040040 filed on Oct. 26, 2022, and claims priority from Japanese Patent Application No. 2021-178590 filed on Nov. 1, 2021, the entire content of which is incorporated herein by reference.

TECHNICAL FIELD

The present invention relates to a conductive nonwoven fabric, a shielding tape, and a wire harness.

BACKGROUND ART

In the related art, a cable has been proposed in which a conductive nonwoven fabric including a nonwoven fabric and a metal layer formed on a surface of the nonwoven fabric is arranged on an outer periphery of an electric wire. The cable can be easily bent due to excellent expansion and compression performance of the nonwoven fabric while exhibiting an electromagnetic shielding effect due to the metal layer of the conductive nonwoven fabric.

As for details of the above cable, refer to JP 2019-075375 A.

However, in the conductive nonwoven fabric used for the above cable, the metal layer is formed only on the surface of the nonwoven fabric, so that shielding performance is not sufficient, and the conductive nonwoven fabric is positioned as an auxiliary shielding member. Therefore, in the above cable, it is necessary to provide an external conductor layer in addition to the conductive nonwoven fabric, and a structure of the cable is complicated.

SUMMARY OF INVENTION

Aspect of non-limiting embodiments of the present disclosure relates to provide a conductive nonwoven fabric, a shielding tape, and a wire harness that can achieve both improved shielding performance and restrain complication of a cable structure.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the invention, there is provided a conductive nonwoven fabric comprising:

a nonwoven fabric; and a plating portion comprising a conductive metal and covering a fiber of the nonwoven fabric, a value obtained by dividing an electric resistance value at an intermediate layer of the conductive nonwoven fabric by an electric resistance value at a surface layer of the conductive nonwoven fabric being 4.0 or less, the intermediate layer being a layer at an intermediate position in a thickness direction of the conductive nonwoven fabric.

BRIEF DESCRIPTION OF DRAWINGS

Exemplary embodiment(s) of the present invention will be described in detail based on the following figures, wherein:

FIG. 6 is a table showing a formation state of each of plating portions in Examples 1 and 2 and Comparative Examples 1 to 4.

DESCRIPTION OF EMBODIMENTS

Hereinafter, the invention will be described with reference to preferred embodiments. It should be noted that the present invention is not limited to the following embodiments, and modifications can be appropriately made without departing from the gist of the present invention. In addition, in the embodiments described below, although there are portions in which illustration and description of a part of the configuration are omitted, it is needless to say that a publicly known or well-known technique is appropriately applied to the details of the omitted technique within a range in which no contradiction with the contents described below occurs.

Figure 1:
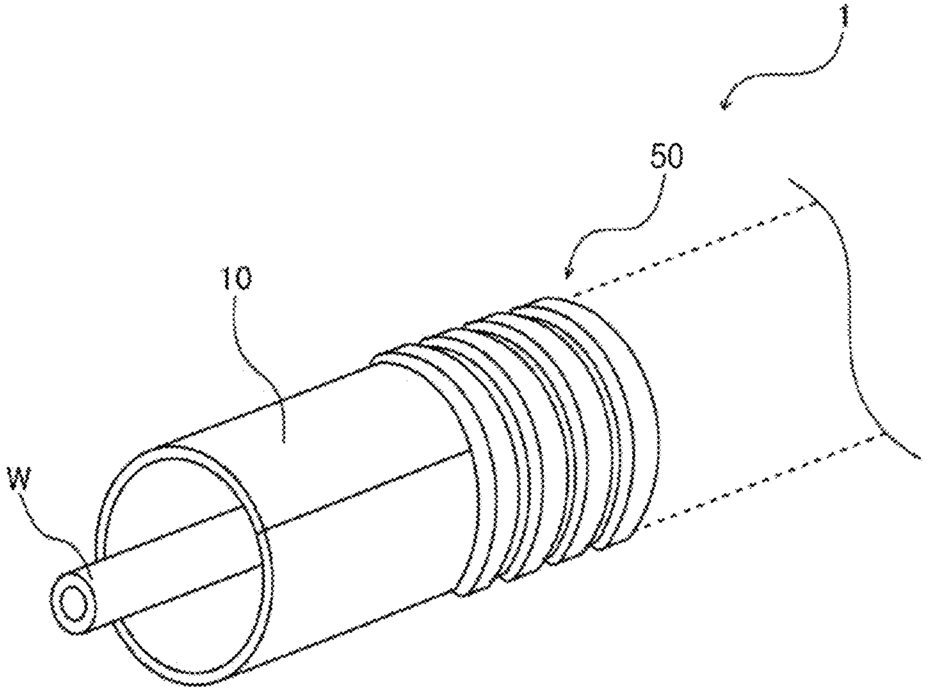
FIG. 1 is a perspective view illustrating a wire harness according to an embodiment of the invention.

FIG. 1 is a perspective view illustrating a wire harness 1 according to an embodiment of the invention. The wire harness 1 according to the present embodiment includes an electric wire W, a corrugated tube 50, and a shielding tape 10 attached to an inner wall surface of the corrugated tube 50. The wire harness 1 may include another tube member instead of the corrugated tube 50, or may include a tape wound around the corrugated tube 50 or another tube member.

The electric wire W includes a conductor made of, for example, copper, aluminum, or an alloy thereof, and an insulating covering portion covering the conductor. In the present embodiment in FIG. 1, the conductor of the electric wire W is made of a single element wire. However, the conductor of the electric wire W may be a twisted wire formed by twisting a plurality of element wires. Further, the wire harness 1 may include a plurality of the electric wires W.

The corrugated tube 50 is a cylindrical member that is formed with a bellows portion on which irregularities are alternately and continuously formed in a longitudinal direction. The corrugated tube 50 is made of a resin. For example, since the electric wire W is inserted through end portions of the corrugated tube 50, the corrugated tube 50 is disposed to cover the periphery of the electric wire W.

Figure 2A:
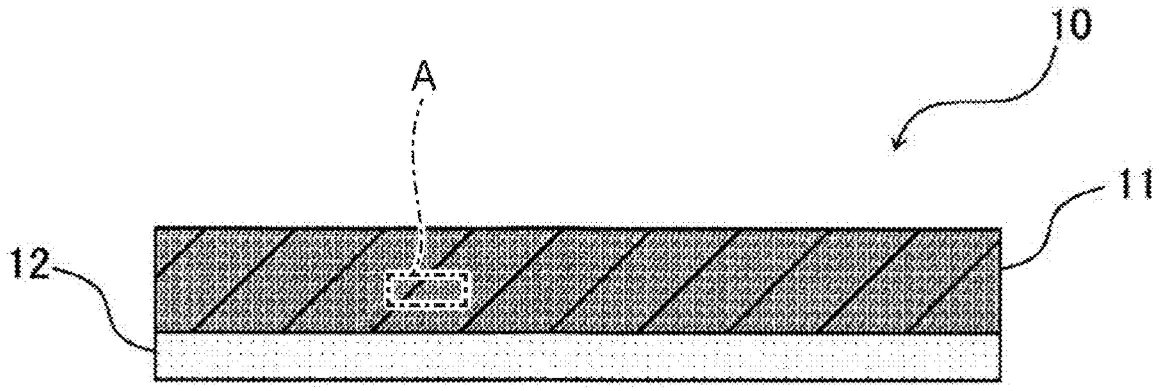
FIG. 2A is a cross-sectional view of a shielding tape when the shielding tape is cut along a plane along an axial direction of the wire harness in FIG. 1.
Figure 2B:
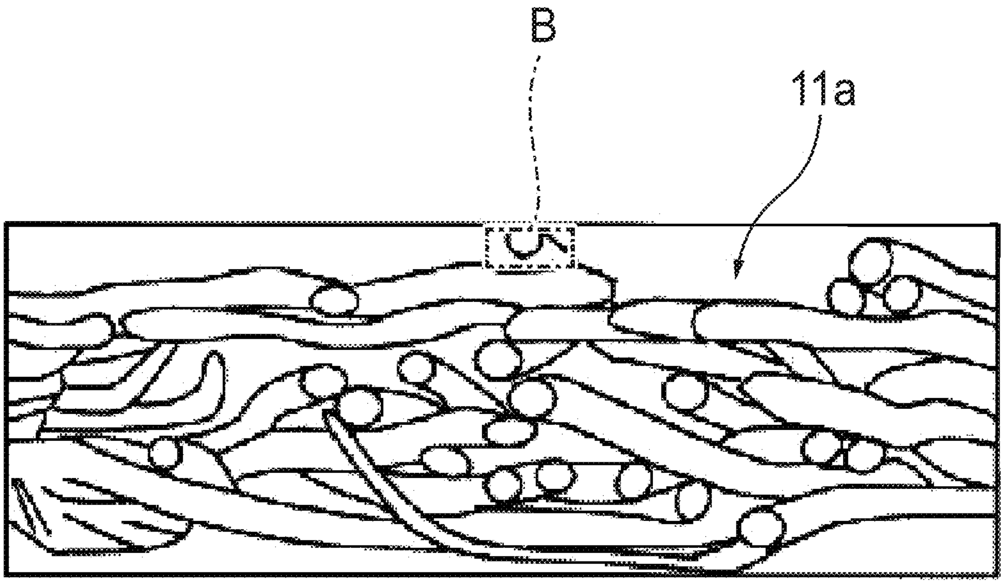
FIG. 2B is an enlarged view of a portion A in FIG. 2A.
Figure 2C:
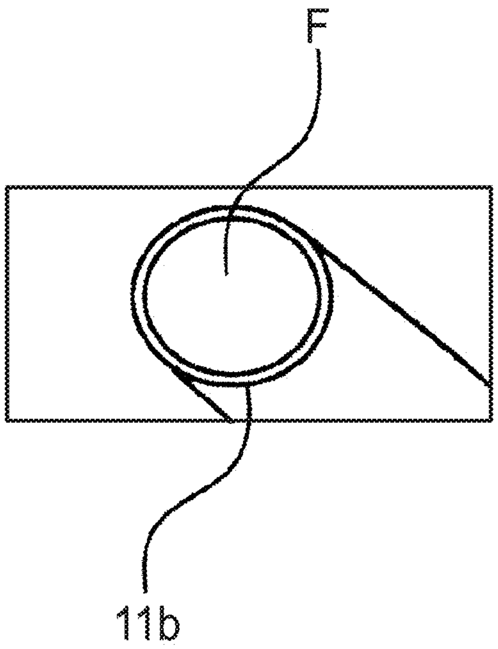
FIG. 2C is an enlarged view of a portion B in FIG. 2B.

The shielding tape 10 includes a conductive nonwoven fabric 11 as a shielding layer that exhibits a shielding function against external noise or the like. FIG. 2A is a cross-sectional view of the shielding tape 10 when the shielding tape 10 is cut along a plane along an axial direction of the wire harness 1 in FIG. 1, FIG. 2B is an enlarged view of a portion A in FIG. 2A, and FIG. 2C is an enlarged view of a portion B in FIG. 2B. As illustrated in FIG. 2A, the shielding tape 10 includes the conductive nonwoven fabric 11 and an adhesive layer 12 disposed to be laminated on the conductive nonwoven fabric 11 (that is, on a front surface or a back surface of the conductive nonwoven fabric 11). As illustrated in FIG. 1, the shielding tape 10 is attached to the inner wall surface of the corrugated tube 50 via the adhesive layer 12, and is provided to surround the electric wire W.

As illustrated in FIG. 2B, the conductive nonwoven fabric 11 includes a nonwoven fabric 11*a* and a plating portion 11*b*. The nonwoven fabric 11*a* is a sheet-shaped member that is formed not by weaving fibers but by entangling the fibers, and has a predetermined thickness. As illustrated in FIG. 2B, in terms of manufacturing characteristics, the nonwoven fabric 11*a* has a structure in which a fiber F constituting the nonwoven fabric 11*a* is arranged in a multilayer shape in a thickness direction. The nonwoven fabric 11*a* is made of, for example, a fiber made of a resin such as polyethylene terephthalate (PET), polypropylene, nylon, and acrylic, glass fiber, carbon fiber, aramid fiber, and polyarylate fiber.

The plating portion 11*b* is a conductive metal covering the fiber F constituting the nonwoven fabric 11*a*. The plating portion 11*b* is made of, for example, copper, nickel, tin, silver, or an alloy of these metals. The plating portion 11*b* may be formed in a single layer shape so as to cover the fiber F constituting the nonwoven fabric 11*a*, or may be formed in a multilayer shape. As an example, the plating portion 11*b* may have a multilayer structure in which a first layer made of copper is provided to cover the fiber F constituting the nonwoven fabric 11*a*, and a second layer made of tin is provided to cover the first layer.

Figure 3:
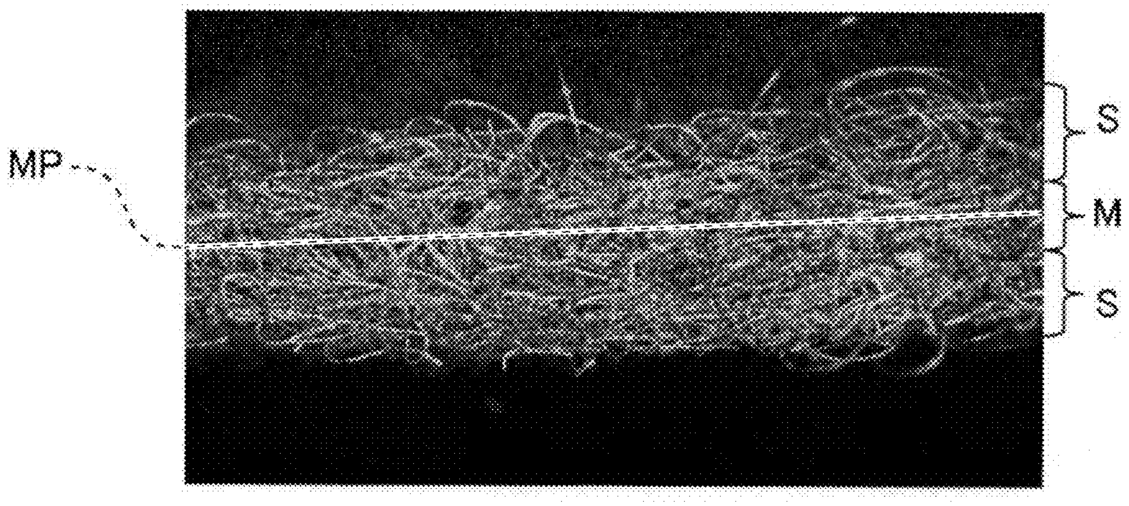
FIG. 3 is an electron microscope photograph of a conductive nonwoven fabric of the shielding tape, which shows a cross section corresponding to FIG. 2A.
Figure 4:
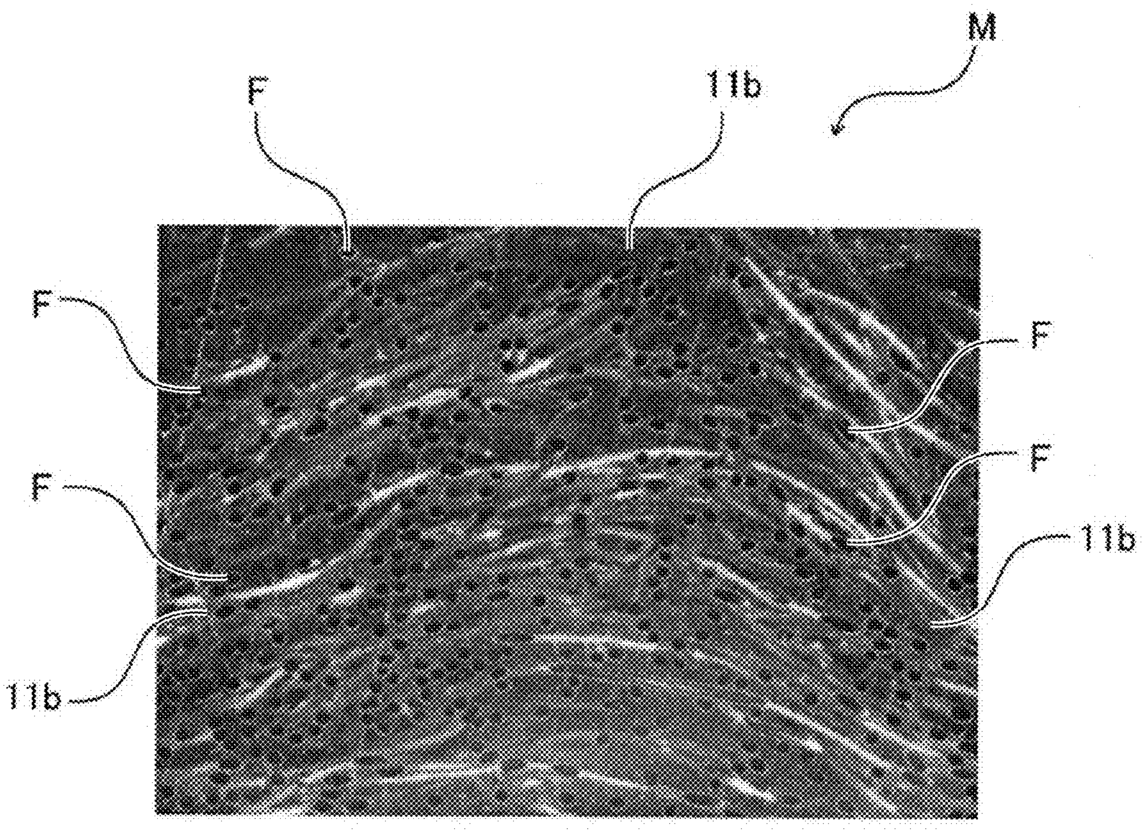
FIG. 4 is an enlarged view of a portion corresponding to an intermediate layer of the conductive nonwoven fabric in the electron microscope photograph in FIG. 3.

Here, in the conductive nonwoven fabric 11 according to the present embodiment, the plating portion 11*b* is formed up to the inside of the nonwoven fabric 11*a*. FIG. 3 is an electron microscope photograph showing a cross section of the conductive nonwoven fabric 11 in which the plating portion 11*b* is formed on the resin-made fiber F, and FIG. 4 is an enlarged view of a portion corresponding to an intermediate layer M of the conductive nonwoven fabric 11 in the electron microscope photograph in FIG. 3.

As illustrated in FIG. 2B, the fiber F constituting the nonwoven fabric 11*a* is arranged in a multilayer shape in the thickness direction of the nonwoven fabric 11*a*. In the conductive nonwoven fabric 11 according to the present embodiment, the plating portion 11*b* is formed not only on a surface layer S (see FIG. 3) but also on the intermediate layer M (see FIGS. 3 and 4) that serves as an intermediate position MP in the thickness direction. In FIG. 4, due to the insulating property of the resin-made fiber F, a cross section of the fiber F is observed in a black dot shape on an image obtained by the electron microscope. On the other hand, portions other than the cross section of the fiber F are observed in a fiber shape. Accordingly, it can be said that the plating portion 11*b* is appropriately formed on the fiber F in the intermediate layer M of the conductive nonwoven fabric 11.

In particular, in the conductive nonwoven fabric 11 according to the present embodiment, a value obtained by dividing an electric resistance value Rm at the intermediate layer M of the conductive nonwoven fabric 11 by an electric resistance value Rs at the surface layer S (strictly, a surface) of the conductive nonwoven fabric 11 is 4.0 or less. In general, even if the conductive nonwoven fabric is subjected to a plating treatment, the plating portion is formed only near the surface layer, and the plating portion is not easily formed up to the inside (the intermediate layer). However, in the conductive nonwoven fabric 11 according to the present embodiment, the plating portion 11*b* is formed up to the intermediate layer M. Therefore, the surface layer S on one side and the surface layer S on the opposite side are conductible via the intermediate layer M.

The conductive nonwoven fabric 11 preferably has a thickness of 50 μm or more and 2.0 mm or less. As illustrated in FIG. 2B, in the conductive nonwoven fabric 11, the fiber F constituting the nonwoven fabric 11*a* is arranged in the multilayer shape in the thickness direction, so that the plating portion 11*b* is also arranged in a multilayer shape in the thickness direction. As a result, the conductive nonwoven fabric 11 can exhibit higher shielding performance than that of a single-layer metal foil or the like. However, in a case where the thickness of the conductive nonwoven fabric 11 is less than 50 μm, the number (layers) of fibers F overlapping each other in the thickness direction is small, and there is a possibility that the shielding performance cannot be sufficiently exhibited. On the other hand, in a case where the thickness is more than 2 mm, there is a concern about an increase in manufacturing burden, for example, a time is required for a treatment of forming the plating portion 11*b* on the intermediate layer M (see FIG. 3).

Figure 5:
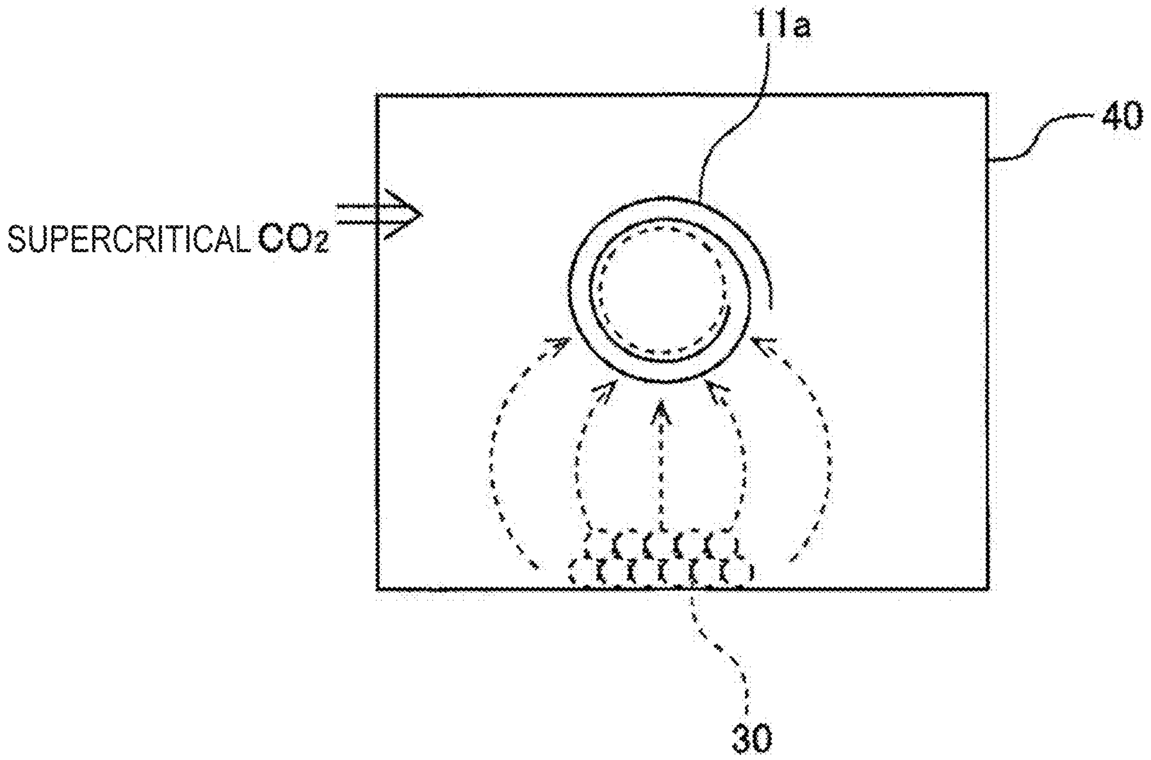
FIG. 5 is a schematic diagram for describing a plating pretreatment method to be applied to the conductive nonwoven fabric.

Next, a method for manufacturing the conductive nonwoven fabric 11 according to the present embodiment will be described. FIG. 5 is a schematic diagram for describing a plating pretreatment method according to the present embodiment.

First, the nonwoven fabric 11*a* is prepared. Here, the prepared nonwoven fabric 11*a* is made of, for example, a fiber made of a resin such as polyethylene terephthalate, polypropylene, nylon, and acrylic, glass fiber, carbon fiber, aramid fiber, and polyarylate fiber.

Next, a treatment using a supercritical fluid (for example, carbon dioxide) is applied to the nonwoven fabric 11*a*. According to the treatment, as illustrated in FIG. 5, an organic metal complex 30 soluble in the supercritical fluid (for example, palladium, nickel, or the like that is soluble in the carbon dioxide in a supercritical state) is housed in a housing 40. Further, the nonwoven fabric 11*a* is housed in the housing 40 in a state where the nonwoven fabric 11*a* is wound, for example, twice around a cylindrical bobbin.

In the present embodiment, after the nonwoven fabric 11*a* is housed, the carbon dioxide in the supercritical state is supplied to the housing 40. Supercritical conditions of the carbon dioxide include a pressure of 12 MPa or more and 15 MPa or less, a temperature of 100° C. or higher and 130° C. or lower, and a time of 10 minutes or more and 60 minutes or less. Further, a circulation flow rate during the treatment is 0.5 kg/min or more and 8 kg/min or less.

By the treatment, the organic metal complex 30 is dissolved and reduced in the supercritical carbon dioxide, and a metal generated by the dissolution of the organic metal complex 30 is precipitated to not only the surface layer S (see FIG. 3) but also the intermediate layer M (see FIG. 4) of the nonwoven fabric 11*a*. In particular, the circulation flow rate during the treatment is 0.5 kg/min or more and 8 kg/min or less as a supercritical condition, so that the supercritical carbon dioxide reaches the intermediate layer M of the nonwoven fabric 11*a*, and the metal is sufficiently precipitated to the intermediate layer M. The supercritical carbon dioxide is excellent in solubility and diffusivity, and causes the metal to be easily precipitated to the intermediate layer M of the nonwoven fabric 11*a* without unevenness in a substantially uniform manner.

Next, after a predetermined time elapses (for example, after 30 minutes elapse), the nonwoven fabric 11*a* is taken out from the housing 40. Further, for example, a heating treatment is performed at 150° C. or higher (250° C. or higher depending on heat resistance of the fiber F constituting the nonwoven fabric 11*a*) for 60 minutes or more. By the heating treatment, residual components of the supercritical fluid on the fiber F are removed, and the metal precipitated on the fiber F is activated.

Then, an electroless plating treatment is performed. In the present embodiment, the metal serving as a catalyst is precipitated on the intermediate layer M of the nonwoven fabric 11*a*. Therefore, the plating portion 11*b* is also formed on the intermediate layer M of the nonwoven fabric 11*a* due to the electroless plating treatment.

Through the above steps, the conductive nonwoven fabric 11, which has the value of 4.0 or less obtained by dividing the electric resistance value Rm at the intermediate layer M by the electric resistance value Rs at the surface layer S, is obtained.

Next, examples and comparative examples of the conductive nonwoven fabric 11 according to the present embodiment will be described.

Figure 7:
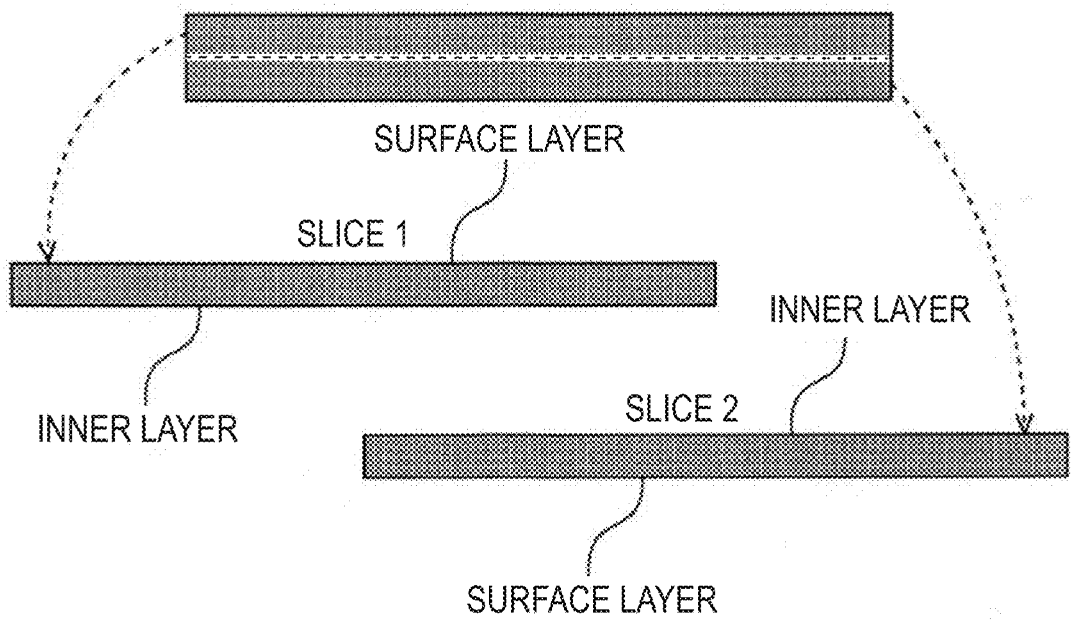
FIG. 7 is a diagram illustrating an evaluation method in Examples 1 and 2 and Comparative Examples 1 to 4.

FIG. 6 is a table showing a formation state of each of the plating portions in Examples 1 and 2 and Comparative Examples 1 to 4, and FIG. 7 is a diagram illustrating an evaluation method in Examples 1 and 2 and Comparative Examples 1 to 4.

Conductive nonwoven fabrics according to Examples 1 and 2 and Comparative Examples 1 and 2 were manufactured by applying the supercritical treatment described above to a PET nonwoven fabric. In the supercritical treatment, palladium hexafluoroacetylacetonate was used as the organic metal complex, and carbon dioxide in a supercritical state was supplied. As supercritical conditions of the carbon dioxide, the temperature was set to 100° C., the pressure was set to 12 MPa, and the time was set to 30 minutes. Next, copper plating was applied by the electroless plating treatment. In Examples 1 and 2, the circulation flow rate was set to 3.8 kg/min, and a thickness of the nonwoven fabric was set to about 1 mm. In Comparative Examples 1 and 2, the circulation flow rate was set to 0.4 kg/min, and the thickness of the nonwoven fabric was set to 3 mm. Due to differences in the circulation flow rate and the thickness of the nonwoven fabric, the copper plating was applied to the inside of the nonwoven fabric in Examples 1 and 2, and the copper plating was applied only to the surface layer of the nonwoven fabric in Comparative Examples 1 and 2.

As the conductive nonwoven fabrics according to Comparative Examples 3 and 4, a conductive nonwoven fabric (manufactured by SEKISUI nano coat technology Co., Ltd.) obtained by applying the copper plating to the PET nonwoven fabric by using a so-called sputtering method was adopted. In Comparative Examples 3 and 4, the thickness of the nonwoven fabric was about 3 mm.

As illustrated in FIG. 7, each of the conductive nonwoven fabrics according to Examples 1 and 2 and Comparative Examples 1 to 4 was cut into two pieces at an intermediate position in the thickness direction (a position corresponding to the intermediate position MP illustrated in FIG. 3), a cut surface was defined as an inner layer, and a surface opposite to the inner layer was defined as a surface layer. One of the two pieces of slices obtained by cutting the conductive nonwoven fabric was defined as a slice 1, and the other one was defined as a slice 2.

As illustrated in FIG. 6, in Example 1, an electric resistance value at a surface of a surface layer of the slice 1 (hereinafter referred to as a "surface resistance") was 0.874 Ω/m, and a surface resistance at an inner layer thereof was 0.375 Ω/m. A surface resistance at a surface layer of the slice 2 was 0.056 Ω/m, and a surface resistance at an inner layer thereof was 0.088 Ω/m. When a thickness of the slice 1 was measured at four predetermined positions of the slice 1, an average value of the thicknesses at the four positions (hereinafter, referred to as a "four-position average") was 0.60 mm, and a four-position average of a thickness of the slice 2 was 0.70 mm.

Therefore, in Example 1, a value obtained by dividing the surface resistance at the intermediate layer by the surface resistance at the surface layer was about 0.43 in the slice 1 and about 1.57 in the slice 2.

In Example 2, the surface resistance at the surface layer of the slice 1 was 0.196 Ω/m, and the surface resistance at the inner layer thereof was 0.615 Ω/m. The surface resistance at the surface layer of the slice 2 was 0.260 Ω/m, and the surface resistance at the inner layer thereof was 0.168 Ω/m. The four-position average of the thickness of the slice 1 was 0.84 mm, and the four-position average of the thickness of the slice 2 was 0.65 mm.

Therefore, in Example 2, the value obtained by dividing the surface resistance at the intermediate layer by the surface resistance at the surface layer was about 3.14 in the slice 1 and about 0.64 in the slice 2.

In Comparative Example 1, the surface resistance at the surface layer of the slice 1 was 0.2207 Ω/m, and since no plating portion was formed on the inner layer, the surface resistance at the inner layer cannot be measured (that is, an extremely large value. In general, a surface resistance of PET was $10^{15}$ f/m or more). The surface resistance at the surface layer of the slice 2 was 0.1892 Ω/m, and the surface resistance at the inner layer cannot be measured (that is, an extremely large value). The four-position average of the thickness of the slice 1 was 1.39 mm, and the four-position average of the thickness of the slice 2 was 1.56 mm.

Accordingly, it was clear that in Comparative Example 1, the value obtained by dividing the surface resistance at the intermediate layer by the surface resistance at the surface layer is an extremely large value.

In Comparative Example 2, the surface resistance at the surface layer of the slice 1 was 0.1303 Ω/m, and since no plating portion was formed on the inner layer, the surface resistance at the inner layer cannot be measured (that is, an extremely large value). The surface resistance at the surface layer of the slice 2 was 0.215 Ω/m, and the surface resistance at the inner layer cannot be measured (that is, an extremely large value). The four-position average of the thickness of the slice 1 was 1.62 mm, and the four-position average of the thickness of the slice 2 was 1.47 mm.

Accordingly, it was clear that in Comparative Example 2, the value obtained by dividing the surface resistance at the intermediate layer by the surface resistance at the surface layer is an extremely large value.

In Comparative Example 3, the surface resistance at the surface layer of the slice 1 was 6.39 kΩ/m, and since no plating portion was formed on the inner layer, the surface resistance at the inner layer cannot be measured (that is, an extremely large value). The surface resistance at the surface layer of the slice 2 was 297.7 kΩ/m, and the surface resistance at the inner layer cannot be measured (that is, an extremely large value). The four-position average of the thickness of the slice 1 was 1.6 mm, and the four-position average of the thickness of the slice 2 was 1.4 mm.

Accordingly, it becomes clear that in Comparative Example 3, the value obtained by dividing the surface resistance at the intermediate layer by the surface resistance at the surface layer is an extremely large value.

In Comparative Example 4, the surface resistance at the surface layer of the slice 1 was 62.66 Ω/m, and since no plating portion was formed on the inner layer, the surface resistance at the inner layer cannot be measured (that is, an extremely large value). The surface resistance at the surface layer of the slice 2 was 355.9 kΩ/m, and the surface resistance at the inner layer cannot be measured (that is, an extremely large value). The four-position average of the thickness of the slice 1 was 1.8 mm, and the four-position average of the thickness of the slice 2 was 1.2 mm.

Accordingly, it was clear that in Comparative Example 4, the value obtained by dividing the surface resistance at the intermediate layer by the surface resistance at the surface layer is an extremely large value.

As described above, in each of the conductive nonwoven fabrics according to Comparative Examples 1 to 4, the plating portion was not formed on the intermediate layer, and the value obtained by dividing the surface resistance at the intermediate layer by the surface resistance at the surface layer was not 4.0 or less. In contrast, in each of the conductive nonwoven fabrics according to Examples 1 and 2, the plating portion was formed on the intermediate layer, and the value obtained by dividing the surface resistance at the intermediate layer by the surface resistance at the surface layer was 4.0 or less. That is, it was found that in each of the conductive nonwoven fabrics according to Examples 1 and 2, the plating portion can be sufficiently formed on the intermediate layer, and the high shielding performance can be exhibited.

Figure 8:
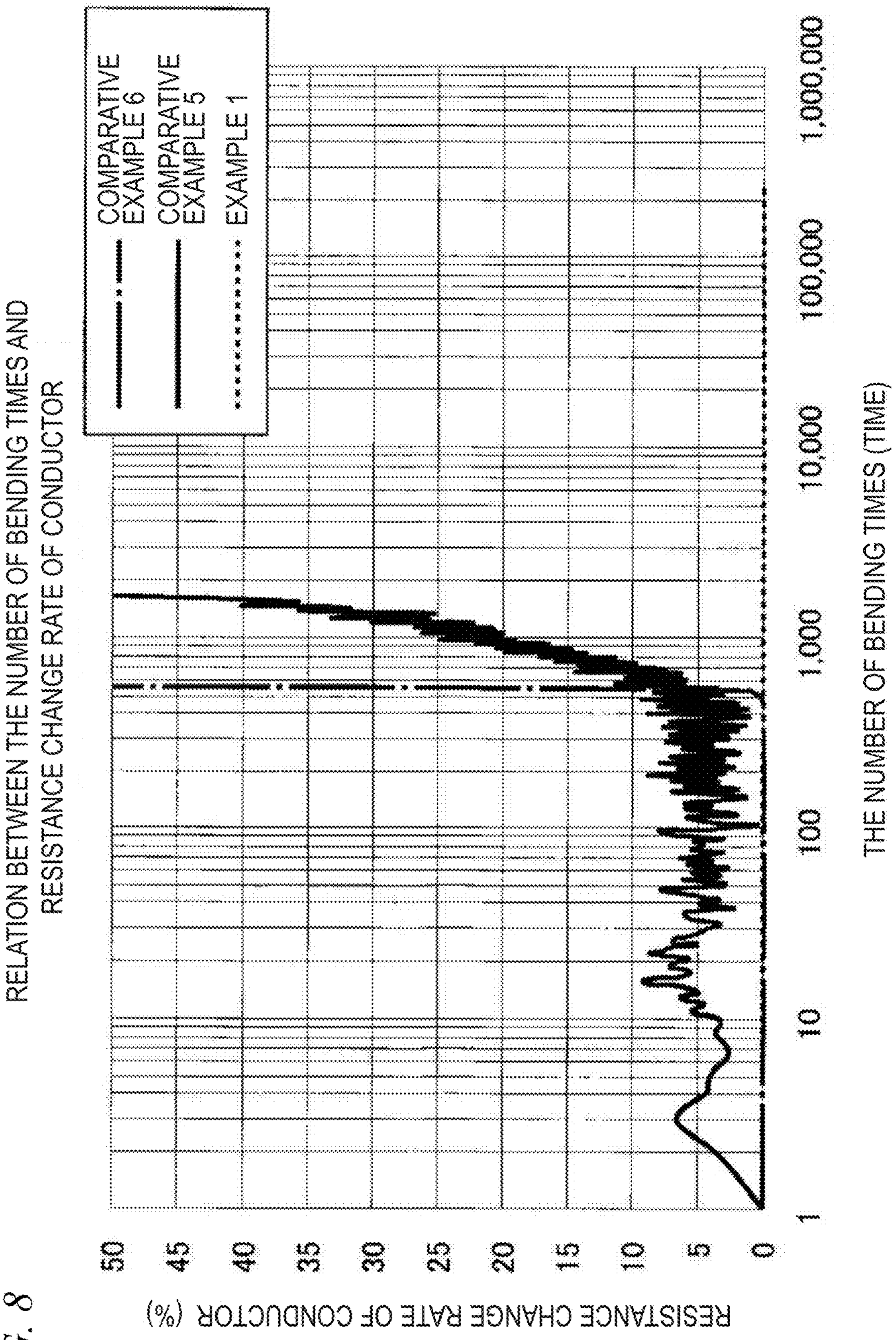
FIG. 8 is a graph illustrating bending resistance in Example 1 and Comparative Examples 5 and 6.

FIG. 8 is a graph illustrating bending resistance of the conductive nonwoven fabric in Example 1 and conductors in Comparative Examples 5 and 6.

As described above, the conductive nonwoven fabric in Example 1 was manufactured by applying the supercritical treatment to the PET nonwoven fabric (see FIGS. 6 and 7). As the conductor in Comparative Example 5, a flat-knitted tin plating soft copper wire having a cross-sectional area of 5.5 sq (manufactured by MEIKO FUTABA Co., Ltd., Trade Name: TBC (5.5 sq)) was used. As the conductor in Comparative Example 6, a copper foil having a thickness of 13 μm was used. Further, the "sq" is substantially the same as "$mm^2$".

In a bending resistance test, a weight of 100 g was attached to one end of each of the conductive nonwoven fabric in Example 1 and the conductors in Comparative Examples 5 and 6, and the one end was set as a fixed side. Then, at room temperature (for example, 23° C.), the other end of each of the conductive nonwoven fabric and the conductors was repeatedly bent at a rate of 30 rpm in an angle range of −90° to 90° by using a mandrel having a bending radius of 1 mm. The number of bending repetition times (the number of fracture times) until one end side and the other end side of each of the conductive nonwoven fabric in Example 1 and the conductors in Comparative Examples 5 and 6 were completely separated from each other was measured.

As a result, the conductive nonwoven fabric in Example 1 was not fractured even after being bent 200,000 times. The conductor in Comparative Example 5 was fractured after being bent 1588 times. The conductor in Comparative Example 6 was fractured after being bent 543 times. Accordingly, it was found that the conductive nonwoven fabric in Example 1 was excellent in flexibility (followability to electric wire bending).

Figure 9:
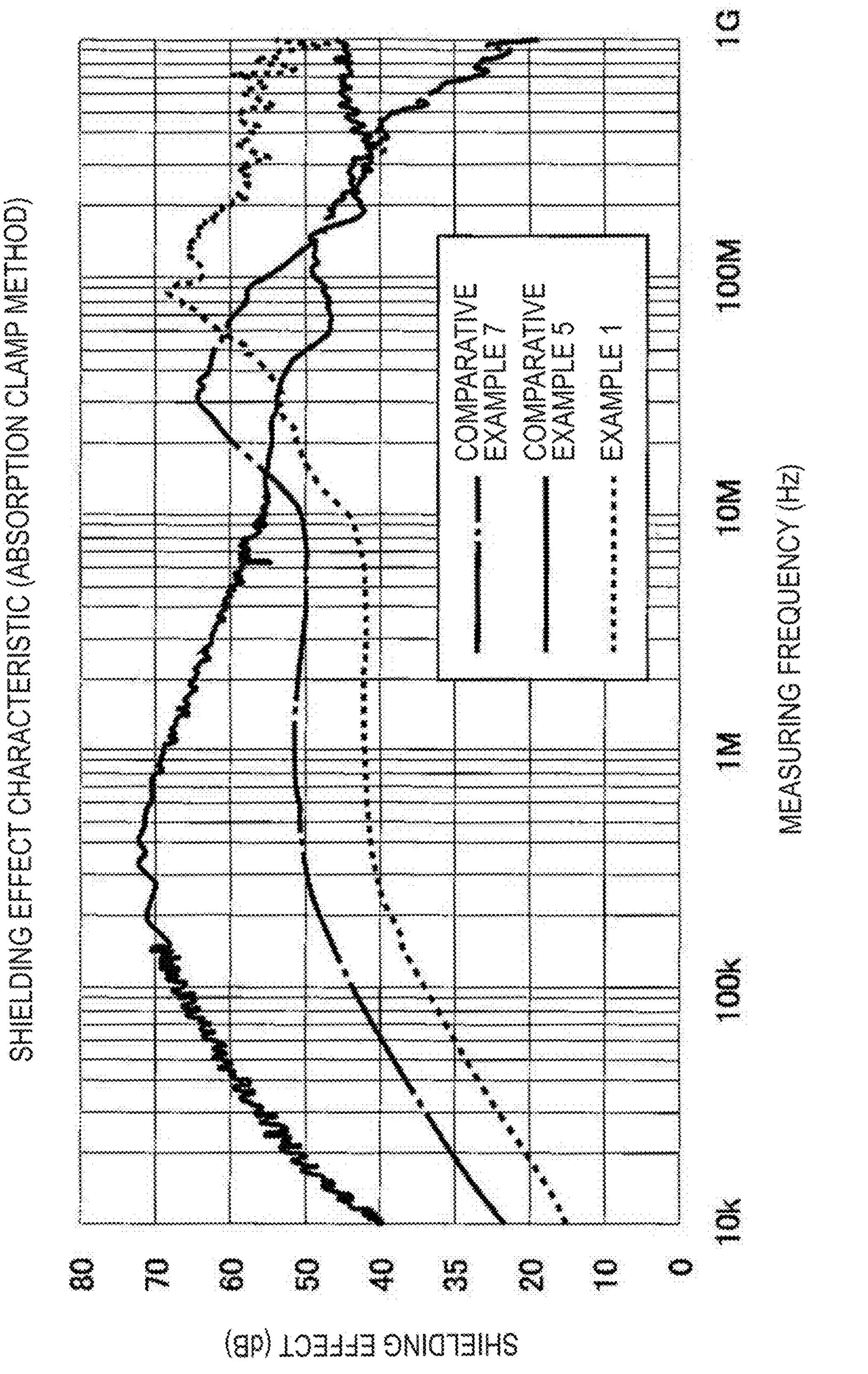
FIG. 9 is a graph illustrating shielding performance in Example 1 and Comparative Examples 5 and 7.

FIG. 9 is a graph illustrating the shielding performance of the conductive nonwoven fabric in Example 1 and the conductors in Comparative Examples 5 and 7.

As described above, the conductive nonwoven fabric in Example 1 was manufactured by applying the supercritical treatment to the PET nonwoven fabric (see FIGS. 6 and 7). As the conductor in Comparative Example 5, the flat-knitted tin plating soft copper wire described above was used. As the conductor in Comparative Example 7, a copper PET film obtained by laminating a copper foil having a thickness of 8 μm and a PET film having a thickness of 12 μm was used. A conductor resistance value of the conductive nonwoven fabric in Example 1 was 830 mΩ/m, a conductor resistance value of the flat-knitted tin plating soft copper wire in Comparative Example 5 was 3.6 mΩ/m, and a conductor resistance value of the copper PET film in Comparative Example 7 was 72 mΩ/m.

A shielding effect of each of the conductive nonwoven fabric and the conductors was evaluated by using an absorption clamp method and setting a sample length of each sample using the conductive nonwoven fabric and the conductors to 1 m. In consideration of magnitudes of the conductor resistance values, it was predicted that the flat-knitted tin plating soft copper wire in Comparative Example 5 achieves the highest shielding effect, and Example 1 achieves the lowest shielding effect. However, in actual fact, as illustrated in FIG. 9, the conductive nonwoven fabric in Example 1 was superior to the conductors in Comparative Examples 5 and 7 in terms of the shielding performance in a high-frequency band of 60 MHz or more.

It is considered that this is due to the fact that according to a shielding theory based on a Kley formula, the fibers are arranged in the multilayer shape in the thickness direction of the conductive nonwoven fabric, and the plating portion is formed on the fibers in the conductive nonwoven fabric of Example 1, so that each of the layers of the fibers exhibits the shielding function.

In this way, the value obtained by dividing the electric resistance value Rm at the intermediate layer M of the conductive nonwoven fabric 11 according to the present embodiment by the electric resistance value Rs at the surface layer S is 4.0 or less. Therefore, the plating portion **11*b* is formed to the intermediate position MP of the conductive nonwoven fabric 11 in the thickness direction. In other words, the surface layer S and the surface layer S on the opposite side of the nonwoven fabric 11*a* are conductible via the intermediate position MP. Therefore, as compared with a case where the plating portion 11*b* is formed only on a surface of the nonwoven fabric 11*a*, the conductive nonwoven fabric 11 can exhibit the higher shielding performance. Since the conductive nonwoven fabric 11 is excellent in the shielding performance, for example, when a wire harness is manufactured by using an electric wire and the conductive nonwoven fabric 11, it is not necessary to provide a shielding layer different from the conductive nonwoven fabric 11, and it is possible to avoid complicating a configuration of the wire harness. That is, it is possible to provide a wire harness that achieves both high shielding performance and simplification of the configuration. Here, the value obtained by dividing the electric resistance value Rm at the intermediate layer M of the conductive nonwoven fabric 11** by the electric resistance value Rs at the surface layer S is preferably 3.2 or less, more preferably 1.6 or less.

The thickness of the conductive nonwoven fabric 11 is 50 μm or more and 2.0 mm or less. Accordingly, since the thickness is 50 μm or more, the fibers of the conductive nonwoven fabric 11 are arranged in the multilayer shape in the thickness direction, so that it is possible to improve the shielding performance. Since the thickness is 2.0 mm or less, the plating portion 11*b* is reliably formed to the intermediate position MP of the conductive nonwoven fabric 11, and it is possible to improve the shielding performance. Therefore, it is possible to provide the conductive nonwoven fabric 11 that is excellent in the shielding performance.

The shielding tape 10 according to the present embodiment includes the conductive nonwoven fabric 11 and the adhesive layer 12, so that the conductive nonwoven fabric 11 can be easily attached to the electric wire W or the like via the adhesive layer 12.

The wire harness 1 according to the present embodiment includes the electric wire W and the shielding tape 10 provided around the electric wire W. In the present embodiment, the shielding tape 10 is attached to the inner wall surface of the corrugated tube 50. However, the shielding tape 10 may be directly attached to the electric wire W.

The invention is not limited to the embodiment described above, and various modifications can be adopted within the scope of the invention. For example, the invention is not limited to the embodiment described above, and modifications, improvements, and the like can be made appropriately. In addition, the material, shape, size, number, arrangement position, and the like of components in the embodiment described above are optional and are not limited as long as the invention can be achieved.

For example, in the present embodiment, the wire harness 1 includes the corrugated tube 50. However, the wire harness 1 may not include the corrugated tube 50. Further, the shielding tape 10 may be directly wound around the electric wire W. When the shielding tape 10 is directly attached to the electric wire W, the electric wire W may be sandwiched between the adhesive layers 12 of two of the shielding tapes 10.

Further, as illustrated in FIG. 1, the shielding tape 10 is attached to the inner wall surface of the corrugated tube 50 in a state where there is no lap portion where the shielding tapes 10 overlap each other. However, the shielding tape 10 may be attached to the inner wall surface of the corrugated tube 50 in a state where there is a lap portion.

Furthermore, according to the present embodiment, the electroless plating treatment is performed after the supercritical treatment and the heating treatment in manufacturing the conductive nonwoven fabric 11. However, when the nonwoven fabric 11*a* is a PET nonwoven fabric, the heating treatment may be omitted. The reason is that in a use environment in a case where the wire harness 1 using the conductive nonwoven fabric 11 is mounted on an automatic vehicle, it is considered that there is no problem in quality even if the heating treatment for the nonwoven fabric 11*a* is omitted from the viewpoint of hydrolysis and heat resistance.

Here, according to the above exemplary embodiment, the conductive nonwoven fabric (11) comprises:

a nonwoven fabric (11*a*); and a plating portion (11*b*) comprising a conductive metal and covering a fiber of the nonwoven fabric (11*a*), a value obtained by dividing an electric resistance value at an intermediate layer (M) of the conductive nonwoven fabric (11) by an electric resistance value at a surface layer (S) of the conductive nonwoven fabric (11) being 4.0 or less, the intermediate layer (M) being a layer at an intermediate position (MP) in a thickness direction of the conductive nonwoven fabric (11).

Further, a thickness of the conductive nonwoven fabric (11) may be 50 μm or more and 2.0 mm or less.

According to the above exemplary embodiment, the shielding tape (10) comprises: the conductive nonwoven fabric (11); and an adhesive layer (12) located to be laminated on the conductive nonwoven fabric (11).

According to the above exemplary embodiment, the wire harness (1) comprises: an electric wire (W); and the shielding tape (10) according to claim 3 located around the electric wire (W).

INDUSTRIAL APPLICABILITY

The conductive nonwoven fabric, the shielding tape, and the wire harness according to the invention can achieve both improved shielding performance and restrain complication of the cable structure. The invention achieving this effect can be used, for example, as a wire harness to be mounted on an automatic vehicle or the like.

REFERENCE SIGNS LIST

1: wire harness
10: shielding tape
11: conductive nonwoven fabric
11*a*: nonwoven fabric
11*b*: plating portion
12: adhesive layer
30: organic metal complex
40: housing
50: corrugated tube
F: fiber
M: intermediate layer
MP: intermediate position
S: surface layer
W: electric wire

What is claimed is:

1. A conductive nonwoven fabric comprising:

a nonwoven fabric; and a plating portion comprising a conductive metal and covering a fiber of the nonwoven fabric, wherein a value obtained by dividing an electric resistance value at an intermediate layer of the conductive nonwoven fabric by an electric resistance value at a surface layer of the conductive nonwoven fabric being 4.0 or less, the intermediate layer being a layer at an intermediate position in a thickness direction of the conductive nonwoven fabric, wherein the plating portion is formed on the surface layer and the intermediate layer and comprises a multilayer structure comprising a first layer covering the fiber of the nonwoven fabric and a second layer covering the first layer, and wherein the nonwoven fabric is made of a fiber made of a resin selected from the group consisting of polyethylene terephthalate (PET), polypropylene, nylon, acrylic, glass fiber, aramid fiber, and polyarylate fiber.

2. The conductive nonwoven fabric according to claim 1, wherein a thickness of the conductive nonwoven fabric is 50 μm or more and 2.0 mm or less.

3. A shielding tape comprising:

the conductive nonwoven fabric according to claim 1; and an adhesive layer located to be laminated on the conductive nonwoven fabric.

4. A wire harness comprising:

an electric wire; and the shielding tape according to claim 3 located around the electric wire.

5. The conductive nonwoven fabric according to claim 1, wherein the first layer is made of copper, nickel, tin, silver, or an alloy including at least two of copper, nickel, tin, or silver, and the second layer is made of a different metal than the first layer and is made of copper, nickel, tin, silver, or an alloy including at least two of copper, nickel, tin, or silver.

* * * * *